Patented Apr. 9, 1946

2,397,951

UNITED STATES PATENT OFFICE 2,397,951

MAKING RED PHOSPHORUS

Thomas W. De Witt, Florence, Ala., assignor to Tennessee Valley Authority, a corporation of the United States No Drawing. Application October 25, 1943, Serial No. 507,606

7 Claims. (Cl. 23—223)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of converting yellow phosphorus into red phosphorus.

The principal object of this invention is to produce a finely divided red phosphorus without the necessity of disintegrating agglomerated material ordinarily produced during the conversion from yellow phosphorus. Another object of this invention is to provide a continuous method for the production of red phosphorus of prime grade. Other objects of this invention include the provision of an economical method for the manufacture of red phosphorus from yellow phosphorus whereby the overall time required for the carrying out of all the steps thereof is materially reduced.

In the commercial manufacture of red phosphorus, liquid yellow phosphorus is heated in a large converter for some three to five days. The solid product is then removed from the converter, ground and leached with a suitable solvent to remove traces of unconverted yellow phosphorus. In such an operation, catalysts such as iodine, bromine, oxides of nitrogen, selenium, or sulfur may be used as a catalyst for accelerating conversion. However, the residual mixture of red phosphorus and a trace of yellow phosphorus is invariably obtained in the form of a cake which requires additional treatment for its disintegration in order to produce a product of suitable fineness and requires particular precaution in handling due to the presence of such phosphorus.

The present invention is directed to a method for making red phosphorus by heating molten yellow phosphorus at a conversion temperature and for a length of time such that a substantial proportion of the yellow phosphorus is converted to red phosphorus but at the same time, the mixture of red and yellow phosphorus produced thereby is always in a fluid condition at the temperature of conversion. The converted red phosphorus is thereby retained in suspension in the unconverted yellow phosphorus. Thereafter, the yellow phosphorus is removed under conditions such that no agglomeration of the finely divided particles of red phosphorus takes place. An example of the production of red phosphorus according to the present invention is given below. Yellow phosphorus was charged into a converter equipped with a reflux and previously freed from an oxidizing atmosphere. The yellow phosphorus was heated to its boiling point and the heating continued until the conversion was carried to fifty percent completion. The mixture of red phosphorus and yellow phosphorus was withdrawn from the converter and charged into a vacuum still fitted with an agitator. The disintegration was carried on until all of the yellow phosphorus in the mixture had been removed. The red phosphorus obtained thereby was in the form of soft friable lumps with the majority of the material having a particle size of 30 to 80 microns. The rate of conversion of yellow phosphorus to red phosphorus becomes appreciable at 260° C. and is of practical significance at the temperature of the boiling point of yellow phosphorus, namely, 280° C. The conversion of yellow phosphorus to red phosphorus is then usually carried to completion; that is, to such a state that the residual mass of solid red phosphorus contains not more than a trace of yellow phosphorus. The principal feature of the present invention is the carrying out of this conversion only so far to at all times have the resulting mixture of red and yellow phosphorus in a fluid condition. However, at the same time, it is obviously desirable to have as high a conversion as possible and still maintain this condition. A converted mixture may have a fair fluidity with sixty per cent of converted red phosphorus therein, but generally it has been found preferable to carry the conversion only to fifty per cent completion. The use of a conversion catalyst may affect the degree to which the conversion may be carried on but still maintain a fluid condition in the mixture. For example, the use of approximately 1% of sulfur as a catalyst results in the production of a mixture with the approximate permissible fluidity with only about forty per cent conversion of the yellow phosphorus to red phosphorus. The converted mixture then not only has a constituency suitable for relatively easy transfer to subsequent steps in the process, but is also particularly suitable for handling according to one specific step, namely, that of separation of red phosphorus therefrom by sedimentation.

Since the reaction involved in the conversion of yellow phosphorus to red phosphorus is exothermic, it is imperative that the conversion temperature be accurately controlled. This is readily accomplished by carrying out the conversion under refluxing conditions. For the simplest operation of the present invention, it is preferable to carry out the conversion at the temperature of the boiling point of phosphorus under atmospheric pressure. The time required for fifty per cent conversion at 280° C. in the absence of catalyst is of the order of 6½ hours. For more effective conversion in a shorter time, it is therefore preferable from the economic standpoint to carry out the conversion under superatmospheric pressures, but still carrying out the operation under conditions such that refluxing is employed to control the reaction. Temperatures of the order of 300° C. and 320° C. and under corresponding pressures of 1.46 and 2.08 atmospheres, respectively, reduced the time required for fifty per cent conversion of yellow phosphorus to red phosphorus to approximately two hours and thirty minutes, respectively. The conversion of yellow phosphorus to red phosphorus and the subsequent separation of the yellow phosphorus from the red phosphorus may be carried out with a converter equipped with an agitator, a reflux, and a condenser. However, it is ordinarily preferable to effect the conversion in one unit and the separation of the yellow phosphorus in another unit. This separation may be effected by a flash distillation, vacuum distillation, or a steam distillation. The final separation of traces of yellow phosphorus may be removed by conventional extraction with a solvent.

The present invention is particularly adapted to continuous operation wherein yellow phosphorus is fed into a converter continuously and the fluid mixture of red and yellow phosphorus continuously withdrawn therefrom. It has been found that the red phosphorus in such a fluent mixture containing up to approximately fifty per cent of red phosphorus can be separated to a substantial extent by sedimentation. In other words, the finely divided slurry of red and yellow phosphorus made up largely of red phosphorus may then be withdrawn after such sedimentation, and the yellow phosphorus returned to the converter.

It will be seen, therefore, that this invention may be carried out by the use of various modifications and changes without departing from its spirit and scope.

I claim:

1. A process of making red phosphorus which comprises (a) heating molten yellow phosphorus at a temperature effective to convert the yellow phosphorus to red phosphorus, (b) discontinuing said heating operation while the proportion of yellow phosphorus to red phosphorus is such that the mixture is in a fluent condition at the pressure and temperature of conversion, and (c) separating the unconverted yellow phosphorus from the red phosphorus in the mixture in such fluent condition without any appreciable further conversion of the yellow phosphorus run to red phosphorus.

2. A process of making red phosphorus which comprises (a) heating molten yellow phosphorus at a temperature effective to convert the yellow phosphorus to red phosphorus, (b) discontinuing said heating operation when approximately 50% of the yellow phosphorus has been converted to red phosphorus and the mixture is still in a fluent condition at the pressure and temperature of conversion, and (c) separating the unconverted yellow phosphorus from the red phosphorus in the mixture in such fluent condition without any appreciable further conversion of the yellow phosphorus run to red phosphorus.

3. A process of making red phosphorus which comprises (a) heating molten yellow phosphorus under a super-atmospheric pressure at a temperature effective to convert the yellow phosphorus to red phosphorus, (b) discontinuing said heating operation while the proportion of yellow phosphorus to red phosphorus is such that the mixture is in a fluent condition at the pressure and temperature of conversion, and (c) separating the unconverted yellow phosphorus from the red phosphorus in the mixture in such fluent condition without any appreciable further conversion of the yellow phosphorus run to red phosphorus.

4. A process of making red phosphorus which comprises (a) heating molten yellow phosphorus at a temperature effective to convert the yellow phosphorus to red phosphorus, (b) discontinuing said heating operation while the proportion of yellow phosphorus to red phosphorus is such that the mixture is in a fluent condition at the pressure and temperature of conversion, (c) removing the fluent mixture from the heating zone, and (d) separating the unconverted yellow phosphorus from the red phosphorus in the mixture in such fluent condition without any appreciable further conversion of the yellow phosphorus run to red phosphorus.

5. A process of making red phosphorus which comprises (a) refluxing yellow phosphorus at a temperature effective to convert the yellow phosphorus to red phosphorus, (b) discontinuing said refluxing operation after a substantial proportion of the yellow phosphorus has been converted to red phosphorus but with the mixture still in a fluent condition at the pressure and temperature of conversion, and (c) separating the unconverted yellow phosphorus from the red phosphorus in the mixture in such fluent condition without any appreciable further conversion of the yellow phosphorus run to red phosphorus.

6. A process of making red phosphorus which comprises (a) heating molten yellow phosphorus at a temperature effective to convert the yellow phosphorus to red phosphorus, (b) discontinuing said heating operation while the proportion of yellow phosphorus to red phosphorus is such that the mixture is in a fluent condition at the pressure and temperature of conversion, and (c) separating the unconverted yellow phosphorus from the red phosphorus in the mixture while maintaining the mixture in such fluent condition without any appreciable further conversion of the yellow phosphorus run to red phosphorus in a state of agitation therefore preventing any appreciable agglomeration of particles of red phosphorus.

7. A process of making red phosphorus which comprises (a) heating molten yellow phosphorus at a temperature effective to convert the yellow phosphorus to red phosphorus, (b) discontinuing said heating operation while the proportion of yellow phosphorus to red phosphorus is such that the mixture is in a fluent condition at the pressure and temperature of conversion, (c) removing the fluent mixture from the heating zone, (d) separating a substantial proportion of the red phosphorus from the fluent mixture in such fluent condition without any appreciable further conversion of the yellow phosphorus run to red phosphorus, and (e) further heating the yellow phosphorus containing a small proportion of red phosphorus resulting from said separation according to step a of the process defined herein.

THOMAS W. DE WITT.